United States Patent
Miyazaki

(10) Patent No.: US 8,134,370 B2
(45) Date of Patent: *Mar. 13, 2012

(54) SEMICONDUCTOR DEVICE AND METHOD OF CONTROLLING ELECTROSTATIC ACTUATOR

(75) Inventor: Takayuki Miyazaki, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 805 days.

This patent is subject to a terminal disclaimer.

(21) Appl. No.: 12/206,169

(22) Filed: Sep. 8, 2008

(65) Prior Publication Data
US 2009/0072630 A1 Mar. 19, 2009

(30) Foreign Application Priority Data
Sep. 13, 2007 (JP) ................................ 2007-237503

(51) Int. Cl.
*G01R 31/327* (2006.01)
*G01R 27/26* (2006.01)
(52) U.S. Cl. ........................................ 324/415; 324/658
(58) Field of Classification Search .................. 324/415, 324/658
See application file for complete search history.

(56) References Cited

U.S. PATENT DOCUMENTS

| | | | |
|---|---|---|---|
| 5,578,976 A | 11/1996 | Yao | |
| 6,853,476 B2 * | 2/2005 | Martin et al. | 359/290 |
| 7,368,846 B2 * | 5/2008 | Mushika et al. | 310/309 |
| 7,479,785 B2 * | 1/2009 | Liu et al. | 324/415 |
| 2007/0075942 A1 | 4/2007 | Martin et al. | |

FOREIGN PATENT DOCUMENTS

| | | |
|---|---|---|
| JP | 10-149756 | 6/1998 |
| JP | 2002-36197 | 2/2002 |

OTHER PUBLICATIONS

U.S. Appl. No. 12/391,624, filed Feb. 24, 2009, Miyano.

* cited by examiner

*Primary Examiner* — Amy He
(74) *Attorney, Agent, or Firm* — Oblon, Spivak, McClelland, Maier & Neustadt, L.L.P.

(57) ABSTRACT

A semiconductor device controls an electrostatic actuator having first and second electrodes. A voltage generation unit generates different types of voltages applied to the first and second electrodes. A control unit controls voltages generated by the voltage generation unit to be applied to the first and second electrodes. A capacitance detection unit detects a voltage of the first or second electrode to detect a capacitance between the first and second electrodes. The control unit applies a first voltage between the first and second electrodes and then a second voltage smaller than the first voltage between the first and second electrodes. Thereafter, the control unit switches one of the first electrode or the second electrode to a high impedance state and then changes a voltage applied to the other. The capacitance detection unit detects the amount of change in voltage of the first or second electrode to detect a capacitance between the first and second electrodes.

16 Claims, 12 Drawing Sheets

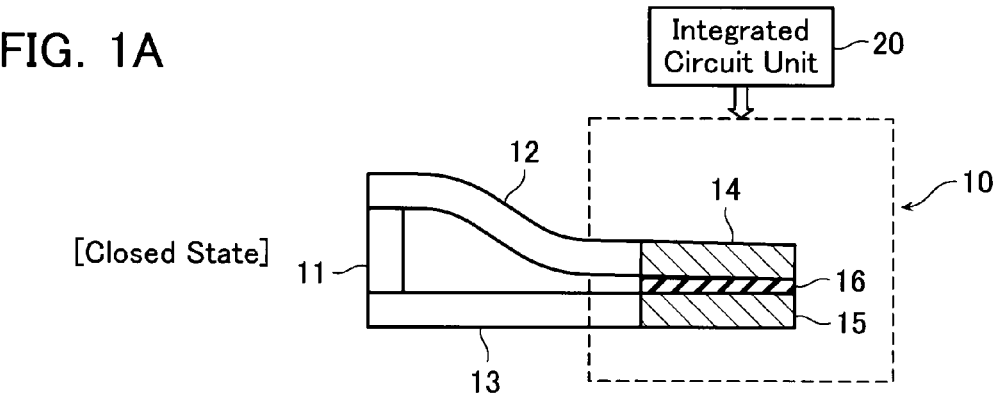
FIG. 1A [Closed State]
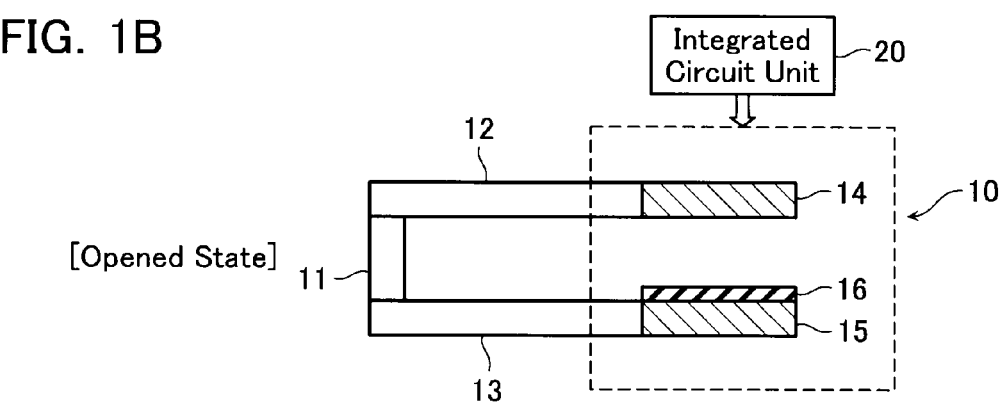
FIG. 1B [Opened State]
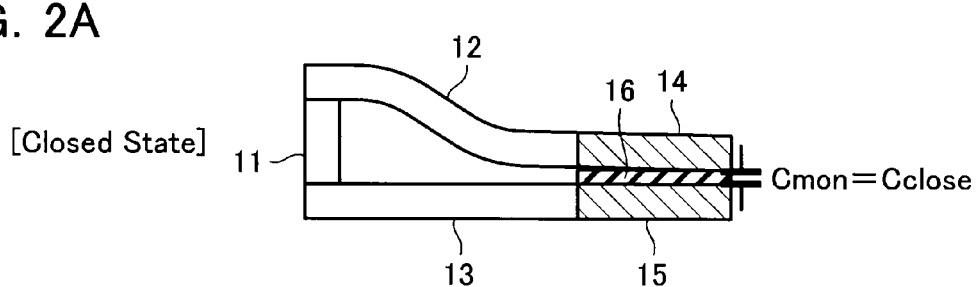
FIG. 2A [Closed State]
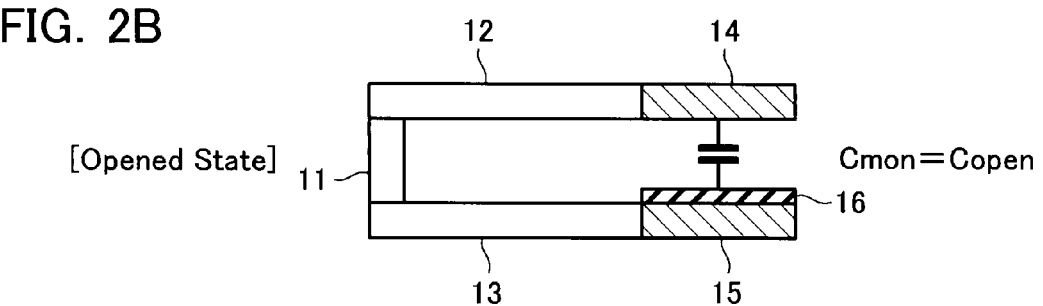
FIG. 2B [Opened State]

SEMICONDUCTOR DEVICE AND METHOD OF CONTROLLING ELECTROSTATIC ACTUATOR

CROSS REFERENCE TO RELATED APPLICATIONS

This application is based on and claims the benefit of priority from prior Japanese Patent Application No. 2007-237503, filed on Sep. 13, 2007, the entire contents of which are incorporated herein by reference.

BACKGROUND OF THE INVENTION

1. Field of the Invention

The present invention relates to a semiconductor device controlling an electrostatic actuator using MEMS (Micro Electro Mechanical Systems) and a method of controlling an electrostatic actuator.

2. Description of the Related Art

Recently, MEMS has attracted increasing attention as a technology for achieving small, lightweight, low power consumption, and high-performance electronics. The MEMS is a system where minute mechanical elements and electronic circuit elements are integrated using silicon process technology.

An example structure of electrostatic type actuators using MEMS technology has been disclosed in U.S. Pat. No. 5,578,976. In order to bring an electrostatic actuator into a closed state (where the upper electrode and the lower electrode come in contact with each other via a insulating film, a potential difference is applied between the upper electrode and the lower electrode so that such electrostatic attraction is provided between the electrodes that is greater than the elastic force of a movable unit to which the upper electrode is fixed.

For the electrostatic actuator in its closed state, the upper electrode and the lower electrode come in contact with each other via the insulating film and larger capacitance is provided between the upper electrode and the lower electrode than in the opened state. At this moment, charges can be injected and trapped into the insulating film using the FN tunnel or Poole-Frenkel mechanism. This phenomenon is expressed as dielectric charging in electrostatic type actuators.

When the amount of charges trapped into the insulating film due to the dielectric charging becomes larger than a certain value, the upper electrode is attracted toward the charges in the insulating film. Accordingly, the electrostatic actuator cannot be changed from its closed state to opened state even if the potential difference between the upper electrode and the lower electrode is set to 0V. This phenomenon is expressed as stiction due to dielectric charging. One of means for avoiding such stiction has been described in, e.g., G. M. Rebeiz, "RF MEMS Theory, Design, and Technology," Wiley-Interscience, 2003, pp. 190-191. It is difficult, however, to eliminate charges trapped into the insulating film and completely exclude stiction. Therefore, there is a need for a semiconductor device that may determine the states of an electrostatic actuator in a simple and accurate way, including whether or not stiction occurs.

SUMMARY OF THE INVENTION

One aspect of the present invention provides a semiconductor device controlling an electrostatic actuator having first and second electrodes formed so as to come close to each other by electrostatic attraction against elastic force, the semiconductor device comprising: a voltage generation unit generating different types of voltages applied to the first and second electrodes; a control unit controlling voltages generated by the voltage generation unit to be applied to the first and second electrodes; and a capacitance detection unit detecting a voltage of the first or second electrode to detect a capacitance between the first and second electrodes; the control unit configured to sequentially perform: applying a first voltage between the first and second electrodes; applying a second voltage smaller than the first voltage between the first and second electrodes; and switching one of the first electrode or the second electrode to a high impedance state and then changing a voltage applied to the other; and the capacitance detection unit configured to detect the amount of change in voltage of the first or second electrode to detect a capacitance between the first and second electrodes.

Another aspect of the present invention provides a method of controlling an electrostatic actuator having first and second electrodes formed so as to come close to each other by electrostatic attraction against elastic force, the method comprising: applying a first voltage between the first and second electrodes; applying a second voltage smaller than the first voltage between the first and second electrodes; switching one of the first electrode or the second electrode to a high impedance state and then changing a voltage applied to the other; and detecting the amount of change in voltage of the first or second electrode to detect a capacitance between the first and second electrodes.

BRIEF DESCRIPTION OF THE DRAWINGS

FIGS. 1A and 1B are conceptual diagrams illustrating a general structure of a semiconductor device according to a first embodiment;

FIGS. 2A and 2B are conceptual diagrams illustrating the electrostatic actuator 10;

DETAILED DESCRIPTION OF THE EMBODIMENTS

Figure 3A:
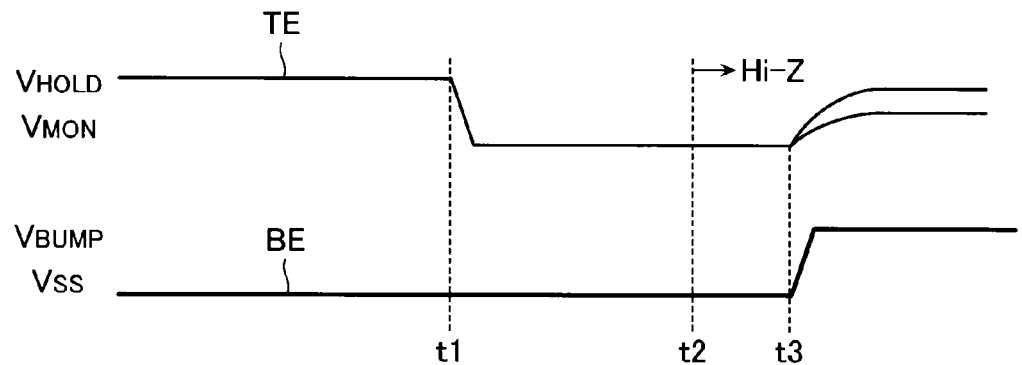
FIG. 3A is a diagram illustrating waveforms of voltages TE and BE applied to the upper electrode 14 and the lower electrode 15 in the first embodiment.

Embodiments of the present invention will now be described in detail below with reference to the accompanying drawings.

First Embodiment

FIG. 1 is a conceptual diagram illustrating a general structure of a semiconductor device according to a first embodiment.

The semiconductor device according to the first embodiment comprises an electrostatic type actuator 10 as illustrated in FIGS. 1A and 1B, for example, and an integrated circuit unit 20 for controlling the electrostatic type actuator 10. The electrostatic actuator 10 has a well-known structure and this embodiment is characterized by the configuration of the integrated circuit unit 20. The electrostatic actuator 10 and the integrated circuit unit 20 may be formed on one silicon substrate using MEMS technology or on a separate silicon substrate.

Referring first to FIGS. 1A and 1B, the configuration of the electrostatic actuator 10 will be described below. FIG. 1A illustrates the electrostatic actuator 10 in its closed state (where an upper electrode 14 and a lower electrode 15 come in contact with each other via an insulating film 16), while FIG. 1B illustrates the electrostatic actuator 10 in its opened state (where the upper electrode 14 and the lower electrode 15 are separated from each other).

As illustrated in FIG. 1A, the electrostatic actuator 10 comprises: a beam unit 11 fixed to a substrate (e.g., silicon substrate), not illustrated in FIG. 1A; a movable unit 12 movable with respect to the beam unit 11; a fixed unit 13 fixed to the beam unit 11; the upper electrode 14 fixed to the movable unit 12; the lower electrode 15 fixed to the fixed unit 13; and the insulating film 16 formed on the surface of the lower electrode 15. The upper electrode 14 and the lower electrode 15 are provided with necessary voltage for respective operations from the integrated circuit unit 20.

To change the electrostatic actuator 10 from its opened state to closed state, a hold voltage $V_{HOLD}$ is applied between the upper electrode 14 and the lower electrode 15 so that the electrostatic attraction between the electrodes 14 and 15 becomes larger than the elastic force of the movable unit 12 to which the upper electrode 14 is fixed.

When the electrostatic actuator 10 is in its closed state, the upper electrode 14 and the lower electrode 15 come in contact with each other via the insulating film 16, as illustrated in FIG. 2A, and the capacitance $C_{mon}=C_{close}$ between both the electrodes 14 and 15 becomes larger than $C_{mon}=C_{open}$ in the opened state (FIG. 2B).

In the closed state, charges may be injected and trapped into the insulating film 16 (dielectric charging) using the FN tunnel or Poole-Frenkel mechanism. When the amount of charges trapped into the insulating film 16 due to the dielectric charging becomes sufficiently large, the upper electrode 14 is attracted toward the charges in the insulating film 16. Accordingly, the electrostatic actuator 10 cannot be changed from its closed state to opened state (i.e., stiction) even if the potential difference between the upper electrode 14 and the lower electrode 15 is set to 0V.

In the semiconductor device of this embodiment, for example, voltages TE (thin line) and BE (thick line) that switch at timings as illustrated in FIG. 3A are applied to the upper electrode 14 and the lower electrode 15, respectively. Procedures for switching voltages are illustrated in the flowchart of FIG. 3B, by which a determination is made regarding the degree of dielectric charging as well as stiction that occur in the electrostatic actuator 10.

Figure 3B:
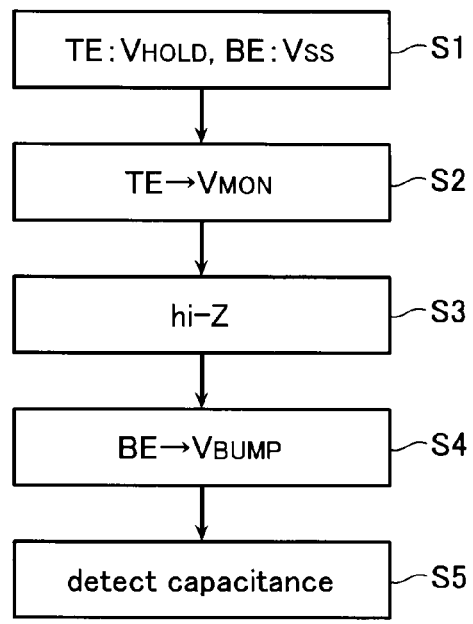
FIG. 3B is a flowchart illustrating the operation of the semiconductor device according to the first embodiment.

Firstly, a hold voltage $V_{HOLD}$ is applied to the upper electrode 14 as voltage TE and a ground voltage Vss (=0V) is applied to the lower electrode 15 as voltage BE so that the upper electrode 14 and the lower electrode 15 come in contact with each other (closed state) (step S1 of FIG. 3B).

Then, at time t1, the voltage TE is switched from the hold voltage $V_{HOLD}$ to a voltage $V_{MON}$ smaller than $V_{HOLD}$ (step S2). The voltage $V_{MON}$ becomes smaller than the minimum voltage necessary for maintaining closed state where dielectric charging is not developing. Thus, if dielectric charging increases to a certain extent, then the upper electrode 14 and the lower electrode 15 will still not be separated from each other after time t1. If dielectric charging increases by a small amount, then the upper electrode 14 and the lower electrode 15 will be separated from each other after time t1. Note that to what extent dielectric charging increases where the electrostatic actuator 10 remains in its closed state depends on the structure of the electrostatic type actuator 10 to be used, etc.

After time t1, the subsequent operations from time t2 (steps S3 through S5 of FIG. 3B) are performed to determine whether the upper electrode 14 and the lower electrode 15 are separated from each other.

Firstly, the upper electrode 14 is electrically separated from a voltage source circuit and brought into a high impedance state (Hi-Z) (step S3). Then, the voltage BE of the lower electrode 15 is switched to a voltage $V_{BUMP}$ that is larger than the ground voltage Vss and smaller than the voltage $V_{MON}$ (step S4). Since the upper electrode 14 is in a high impedance state, the voltage of the upper electrode 14 rises at step S4 due to the capacitive coupling with the lower electrode 15. The magnitude of rise in voltage depends on the magnitude of capacitance. That is, if stiction occurs and if the electrostatic actuator 10 is still in its closed state after time t1, then the magnitude of rise in voltage of the upper electrode 14 becomes relatively large since large capacitance is involved between the electrodes 14 and 15. Conversely, if the electrostatic actuator 10 is in its opened state after time t1, then the magnitude becomes relatively small since small capacitance is involved between the electrodes 14 and 15. Thus, detecting the magnitude of rise in voltage of the upper electrode 14 since time t3 may detect the capacitance between the electrodes 14 and 15 and determine the degree of charging (step S5).

In this method, charging the voltage BE of the lower electrode 15 to a sufficiently high voltage $V_{BUMP}$ allows the electrostatic actuator 10 to shift from its closed state (or opened state) to its opened state, irrespective of the state of dielectric charging. When shifted to the opened state, the charged amount becomes constant and the capacitance between the electrodes 14 and 15 becomes small. Accordingly, the magnitude of rise in the voltage TE of the upper electrode 14 becomes larger and it is easily determined whether the electrostatic actuator 10 is in its opened state or closed state at t1 when the voltage TE of the upper electrode 14 is switched to the voltage $V_{MON}$.

Similarly, this method may also determine charging states by interchanging the voltages applied to the upper electrode 14 and the lower electrode 15 and applying the voltage BE of FIG. 3A to the upper electrode 14 and the voltage TE of FIG. 3A to the lower electrode 15.

Figure 3C:
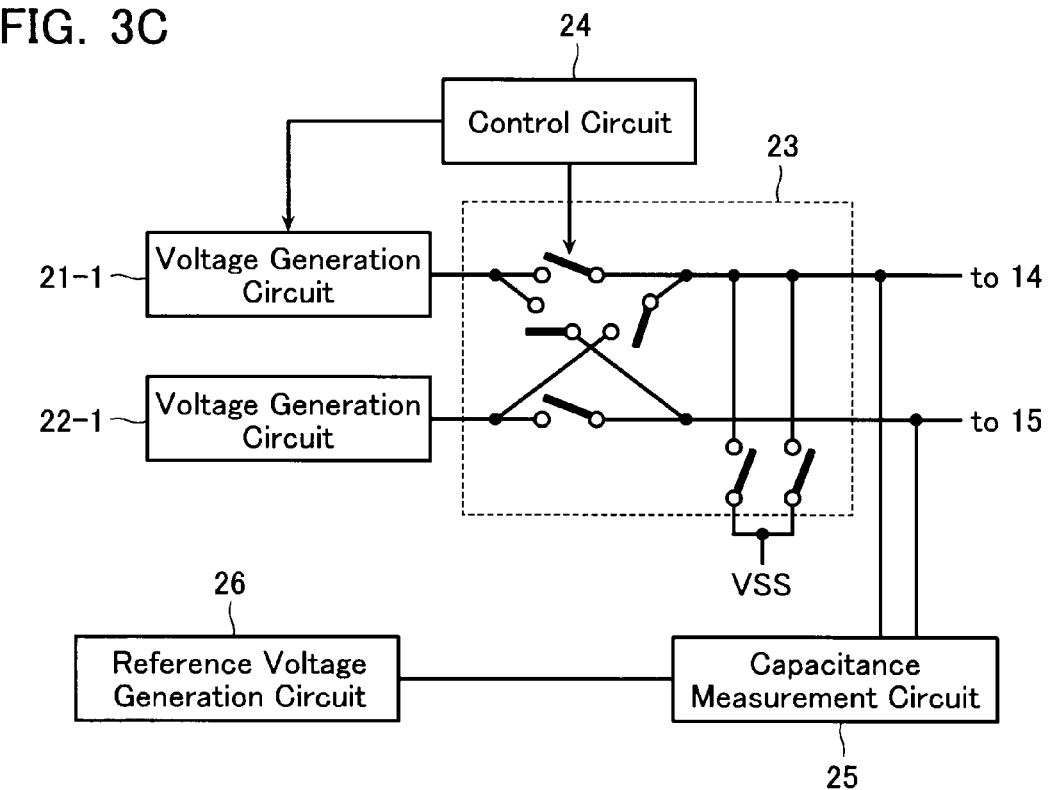
FIG. 3C is a block diagram illustrating an example configuration of the integrated circuit unit 20 included in the semiconductor device according to the first embodiment.

FIG. 3C illustrates an example configuration of the integrated circuit unit 20. In this case, the integrated circuit unit 20 comprises: voltage generating circuits 21-1, 22-1; a switching circuit 23; a control circuit 24; a capacitance measurement circuit 25; and a reference voltage generating circuit 26.

The voltage generating circuit 21-1 generates voltages $V_{HOLD}$ and $V_{MON}$. In addition, the voltage generating circuit 22-1 generates a voltage $V_{BUMP}$.

The switching circuit 23 has functions for selectively connecting one of the voltage generating circuits 21-1 and 22-1 to one of the electrodes 14 or 15 and the other to the remaining electrode, as well as for properly connecting the upper electrode 14 and the lower electrode 15 to the ground voltage Vss. The operations of the voltage generating circuits 21-1, 22-1 and the switching circuit 23 are controlled by the control circuit 24.

In addition, a capacitance measurement circuit 25 is provided to measure voltages of the electrodes 14 and 15 to measure the capacitance between the electrodes 14 and 15. The capacitance measurement circuit 25 performs the measurements by comparing a reference voltage Vref generated at the reference voltage generating circuit 26 with the voltage of the electrode 14 or 15.

Figure 4:
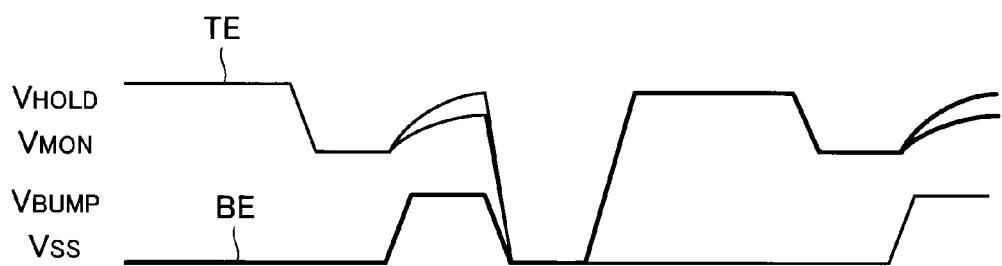
FIG. 4 is a diagram illustrating example waveforms of the voltages TE and BE applied to the upper electrode 14 and the lower electrode 15 in the first embodiment when they are interchanged with each other.

If it is determined that charging or stiction occurs in the semiconductor device of the first embodiment, then the voltages applied to the upper electrode 14 and the lower electrode 15 are interchanged with each other. Then, for example, voltage BE may be applied to the upper electrode 14 and voltage TE applied to the lower electrode 15 in the next measurement of the capacitance, as illustrated in FIG. 4. Otherwise, such interchanging is not performed and measurements may be performed as described above (as illustrated in FIGS. 3A and 3B). This may achieve IBA (Intelligent Bipolar Actuation).

Figure 5:
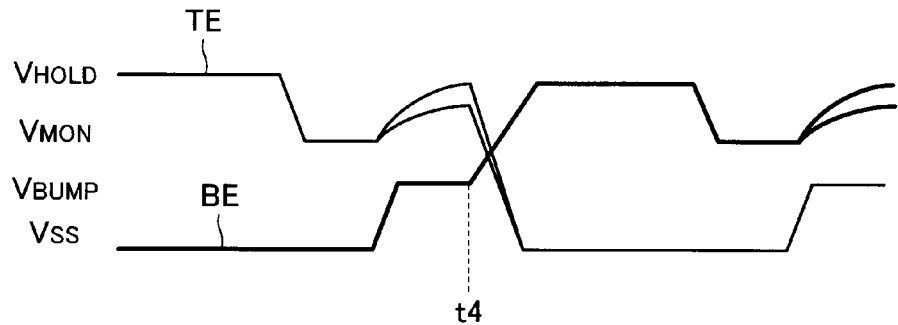
FIG. 5 is a diagram illustrating example waveforms of the voltages TE and BE applied to the upper electrode 14 and the lower electrode 15 in the first embodiment when they are interchanged with each other.

In the example of FIG. 4, although both voltages TE and BE of the electrodes 14 and 15 are once reduced to a ground potential Vss when the voltages applied to the upper electrode 14 and the lower electrode 15 are interchanged with each other, the operation of reducing the voltage to the ground potential Vss may be omitted and the voltage BE may be directly switched from $V_{BUMP}$ to $V_{HOLD}$, as illustrated in FIG. 5. This may reduce the time for shifting in IBA. Particularly, when the electrostatic actuator 10 is already in its closed state before the voltages applied to the electrodes are interchanged, and it still remains in the closed state even after the voltages are interchanged with each other, the operation of FIG. 5 is useful for reducing the time for shifting and contributes to reduced power consumption. That is because the magnitude of voltage to be changed becomes small in this case.

Figure 6:
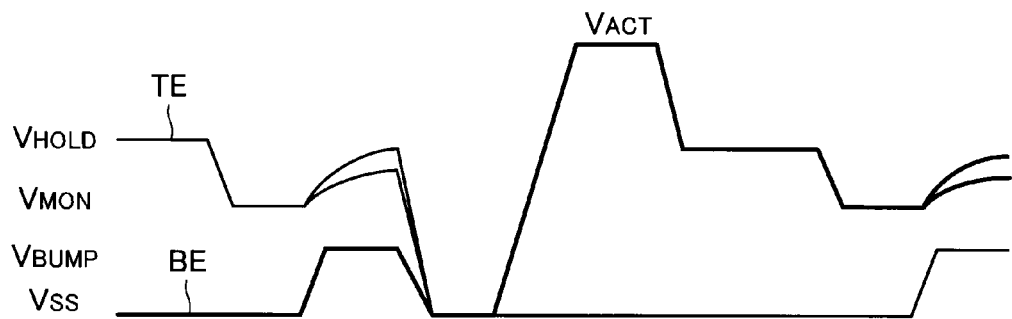
FIG. 6 is a diagram illustrating other example waveforms of the voltages TE and BE applied to the upper electrode 14 and the lower electrode 15 in the first embodiment when they are interchanged with each other.

In addition, when the electrostatic actuator 10 is in its opened state after the voltages applied to the electrodes are interchanged with each other, each voltage TE and BE may be once brought into the same potential (e.g. the ground potential Vss), as illustrated in FIG. 4. Further, in the examples of FIGS. 3A, 4, and 5, although the electrostatic actuator 10 is shifted from its opened state to closed state by applying a hold voltage $V_{HOLD}$ between both the electrodes 14 and 15 shifts, other voltage (actuation voltage $V_{ACT}$) than the hold voltage $V_{HOLD}$ may be used as a voltage for shifting from the opened state to closed state, as illustrated in FIG. 6. The actuation voltage $V_{ACT}$ is higher than the hold voltage $V_{HOLD}$ necessary for maintaining the closed state.

Using this actuation voltage $V_{ACT}$ for shifting allows the magnitude of the hold voltage $V_{HOLD}$ applied to maintain the closed state to be smaller than those applied in other operations of FIG. 3A, etc., which would be effective from a reliability and power consumption standpoint.

Figure 7:
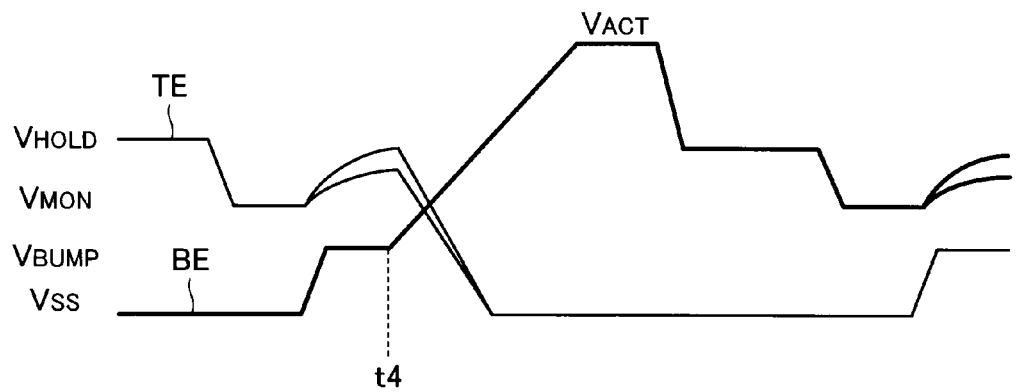
FIG. 7 is a diagram illustrating still other example waveforms of the voltages TE and BE applied to the upper electrode 14 and the lower electrode 15 in the first embodiment when they are interchanged with each other.

Note that, when the actuation voltage $V_{ACT}$ is used in switching between the upper electrode 14 and the lower electrode 15, as illustrated in FIG. 6, the voltages TE and BE may be once reduced to the ground voltage Vss, or, as illustrated in FIG. 7, directly changed from the next voltage $V_{BUMP}$ to $V_{ACT}$ without being reduced to the ground voltage Vss.

Second Embodiment

Figure 8A:
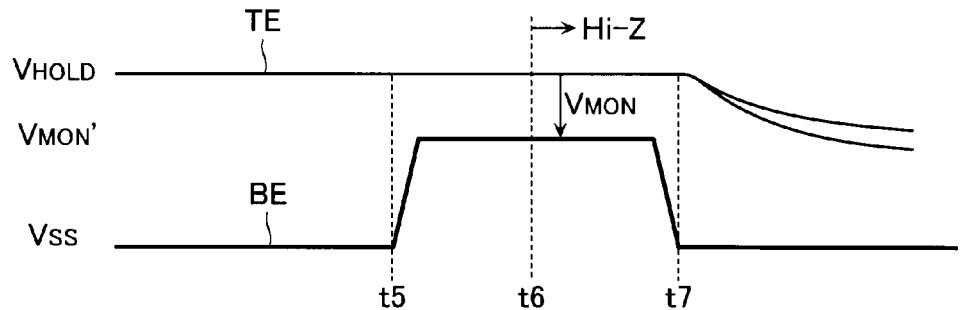
FIG. 8A is a diagram illustrating waveforms of voltages TE and BE applied to the upper electrode 14 and the lower electrode 15 in a second embodiment.
Figure 8B:
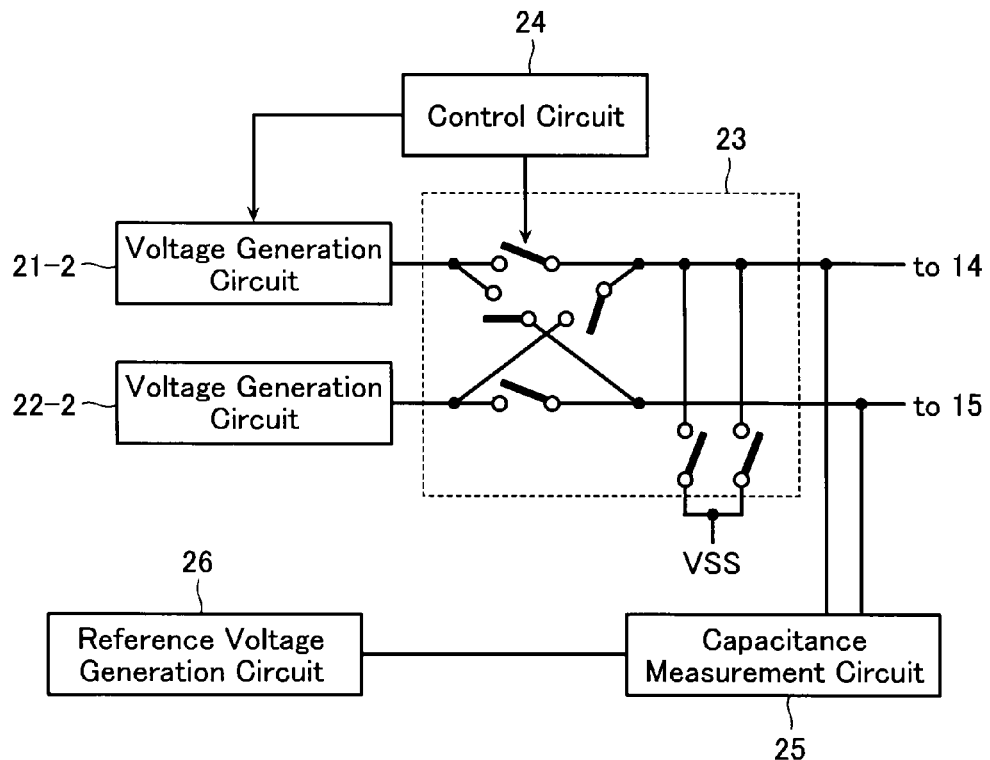
FIG. 8B is a block diagram illustrating the configuration of the integrated circuit unit 20 in a semiconductor device according to a second embodiment.
Figure 9:
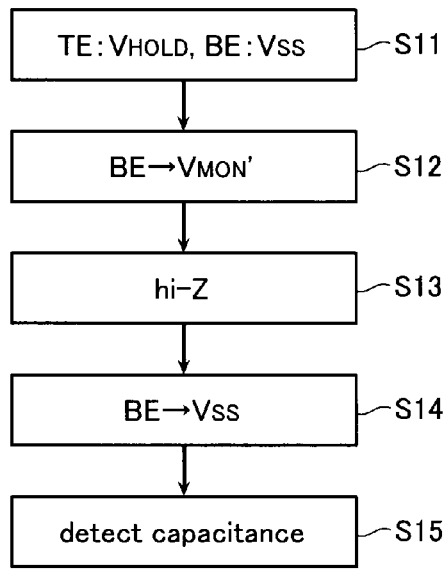
FIG. 9 is a flowchart illustrating the operation of the semiconductor device according to the second embodiment.

Referring now to FIGS. 8A, 8B, and 9, a semiconductor device according to a second embodiment the present invention will be described below. The general structure is the same as that of the first embodiment (FIG. 1) and description thereof will be omitted. FIG. 8A illustrates waveforms of the voltages TE and BE applied in this embodiment. FIG. 8B is a block diagram illustrating the configuration of the integrated circuit unit 20 according to the second embodiment. In addition, FIG. 9 is a flowchart illustrating the operation of the semiconductor device according to the second embodiment.

This embodiment is similar to the first embodiment in that a voltage TE applied to the upper electrode 14 is first set to a hold voltage $V_{HOLD}$ and a voltage BE applied to the lower electrode 15 is set to a ground voltage Vss (step S11 of FIG. 9), in order to bring both electrodes 14 and 15 (FIG. 1) into closed states. However, at time t5, instead of changing the voltage TE from the voltage $V_{HOLD}$ to another voltage $V_{MON}$, the voltage TE remains at the voltage $V_{HOLD}$ and the voltage BE is changed from the voltage Vss to another voltage $V_{MON'}$ (step S12 of FIG. 9). In the second embodiment, a difference between the voltages $V_{HOLD}$ and $V_{MON'}$ corresponds to the voltage $V_{MON}$ of FIG. 3A.

Then, at time t6, the upper electrode 14 is brought into a high impedance state (step S13) and, at time t7, the voltage BE is changed from the voltage $V_{MON}$ to the ground voltage Vss (step S14). As a result, the voltage TE falls due to the capacitive coupling between the upper electrode 14 and the lower electrode 15. Since the magnitude of fall in voltage depends on the magnitude of capacitance, the capacitance between the upper and lower electrodes 14 and 15 may be measured by measuring the magnitude of fall in voltage (step S15), as described in the first embodiment.

FIG. 8B is a block diagram illustrating the configuration of the integrated circuit unit 20 according to the second embodiment. The integrated circuit unit 20 comprises a voltage generating circuit 21-2 that generates a voltage $V_{HOLD}$ and a voltage generating circuit 22-2 that generates a voltage $V_{MON'}$. Other components are the same as those described in the first embodiment (FIG. 3C), which will not be explained in greater detail.

Figure 10:
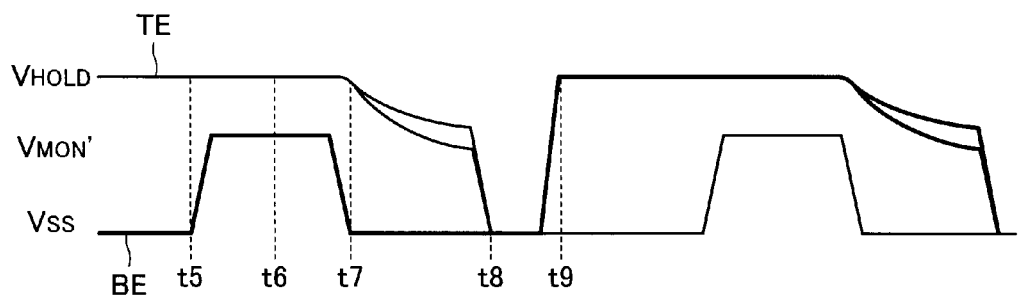
FIG. 10 is a diagram illustrating example waveforms of the voltages TE and BE applied to the upper electrode 14 and the lower electrode 15 in the second embodiment when they are interchanged with each other.
Figure 11:
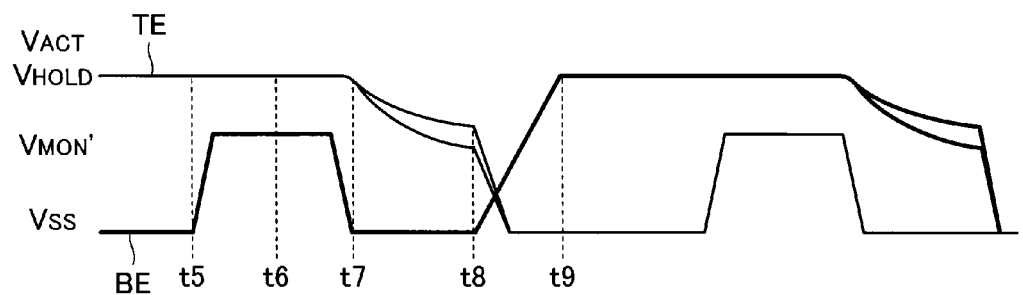
FIG. 11 is a diagram illustrating example waveforms of the voltages TE and BE applied to the upper electrode 14 and the lower electrode 15 in the second embodiment when they are interchanged with each other.
Figure 12A:
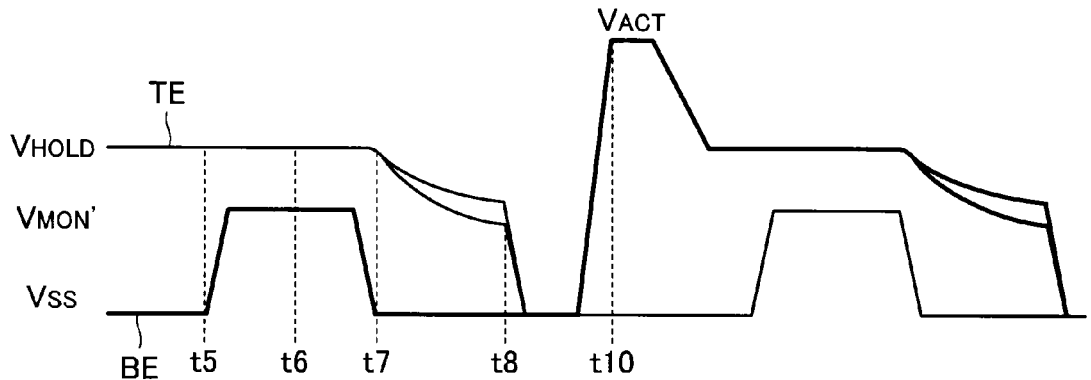
FIG. 12A is a diagram illustrating other example waveforms of the voltages TE and BE applied to the upper electrode 14 and the lower electrode 15 in the second embodiment when they are interchanged with each other.
Figure 12B:
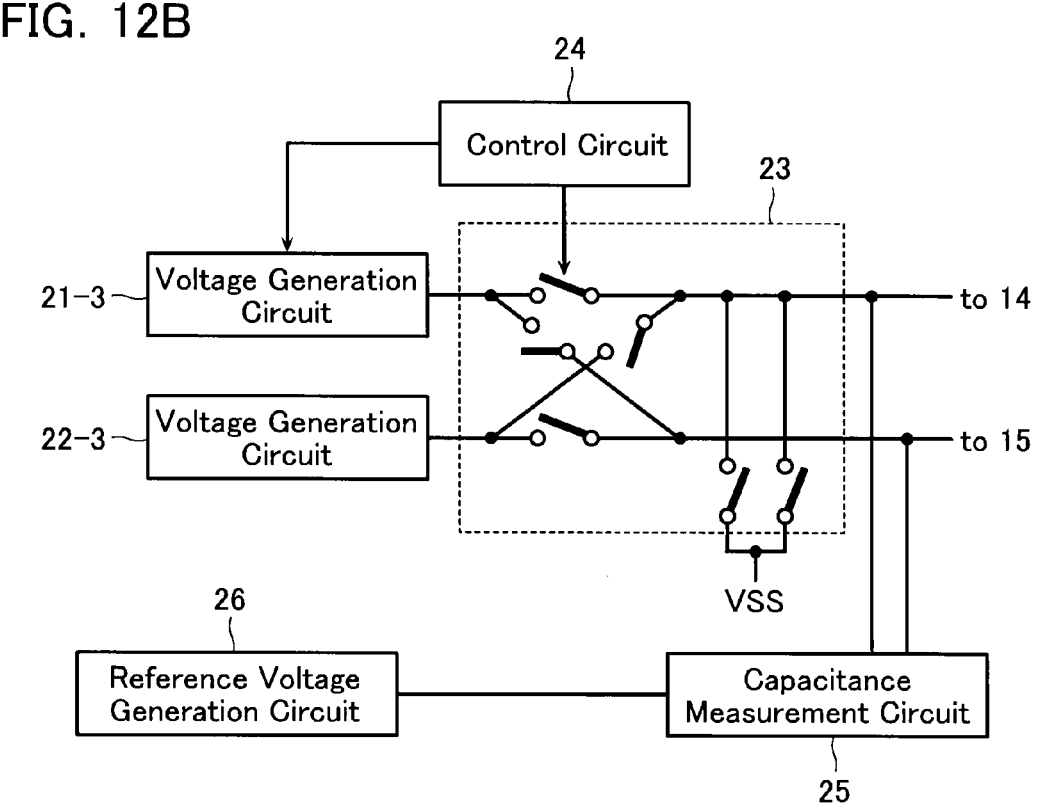
FIG. 12B is a block diagram illustrating an example configuration of the integrated circuit unit 20 included in the semiconductor device according to the second embodiment.
Figure 13:
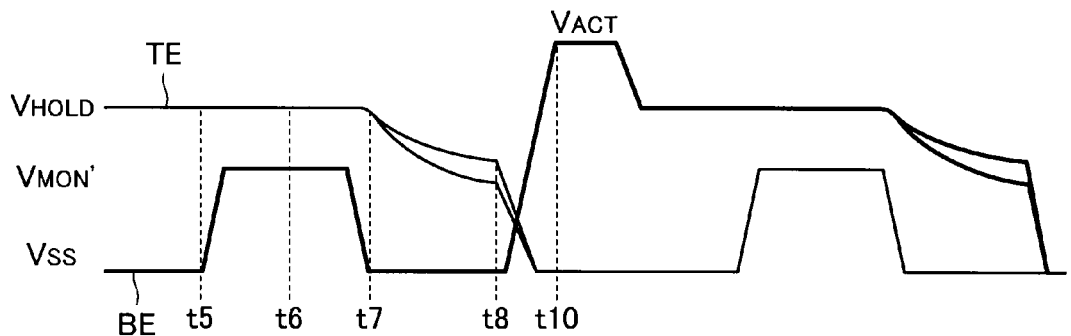
FIG. 13 is a diagram illustrating other example waveforms of the voltages TE and BE applied to the upper electrode 14 and the lower electrode 15 in the second embodiment when they are interchanged with each other.

Also in this embodiment, charging states may be determined, as in the first embodiment, by interchanging the voltages applied to the upper electrode 14 and the lower electrode 15 and applying the voltage BE of FIG. 3A to the upper electrode 14 and the voltage TE of FIG. 3A to the lower electrode 15. At this moment, as illustrated in FIG. 10, when the voltages applied to the upper electrode 14 and the lower electrode 15 are interchanged with each other, a period of time may be provided during which both voltages TE and BE of the electrodes 14 and 15 are once reduced to the ground potential Vss, or that period may be omitted as illustrated in FIG. 11. In addition, as illustrated in FIG. 12A, the above-mentioned actuation voltage $V_{ACT}$ may be used as the voltage TE. As illustrated in FIG. 12B, the integrated circuit unit 20 may have a voltage generating circuit 21-3 that generates voltages $V_{ACT}$ and $V_{HOLD}$ and a voltage generating circuit 22-3 that generates a voltage $V_{MON'}$. Note that, as illustrated in FIG. 12A, when the voltages applied to the upper and lower electrodes 14 and 15 are interchanged, both voltages TE and BE may be reduce to the voltage Vss between times t8 and t10, or otherwise, a period of time may be omitted as illustrated in FIG. 13 during which both the voltage TE and BE are reduced to Vss between times t8 and t10.

Variation of First and Second Embodiments

Figure 14:
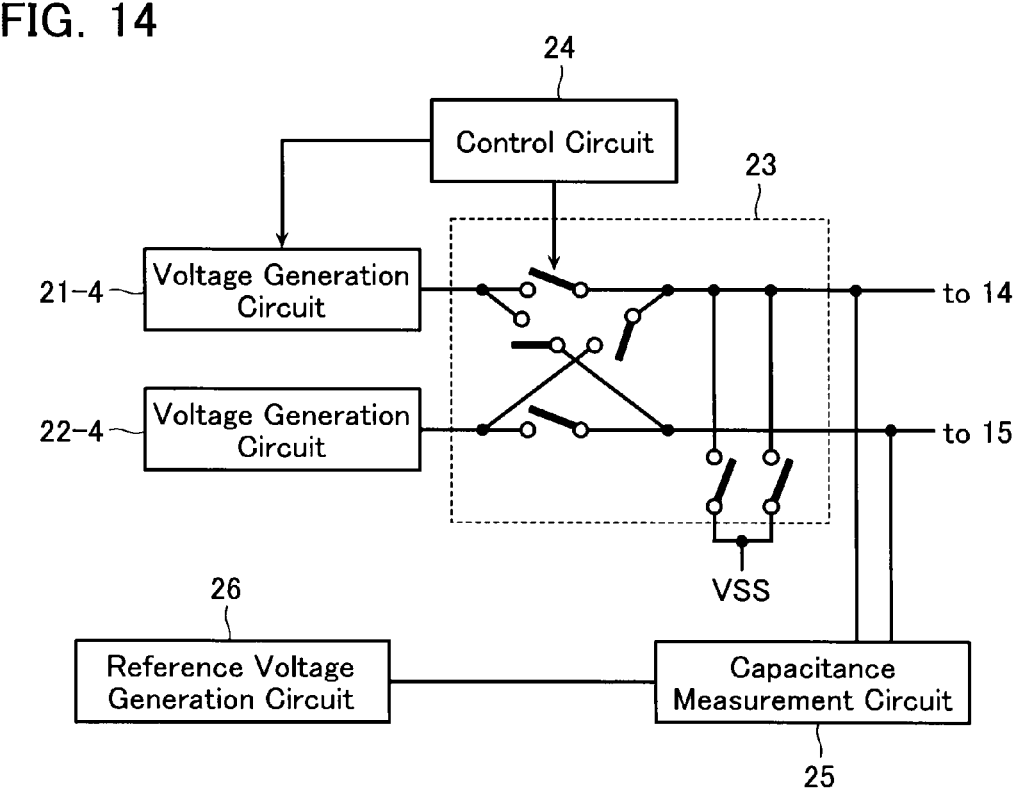
FIG. 14 is a diagram illustrating the configuration of the integrated circuit unit 20 of a semiconductor device according to a variation of the first and second embodiments.
Figure 15:
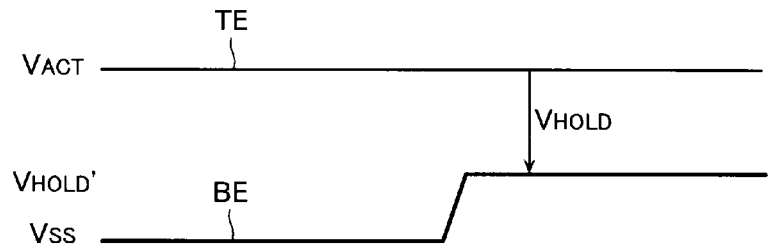
FIG. 15 is a diagram illustrating waveforms of voltages TE and BE applied to the upper electrode 14 and the lower electrode 15 of the semiconductor device according to the variation of the first and second embodiments.
Figure 16:
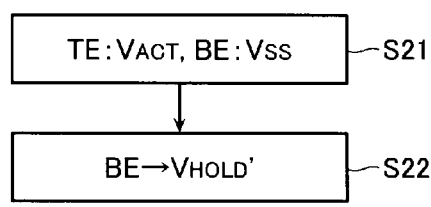
FIG. 16 is a flowchart illustrating the operation of the semiconductor device according to the variation of the first and second embodiments.

Referring now to FIGS. 14, 15, and 16, a variation of the first and second embodiments will be described below. FIG. 14 illustrates the configuration of the integrated circuit unit 20 in a semiconductor device according to the variation, and FIG. 15 illustrates (partial) waveforms of the applied voltages. In addition, FIG. 16 illustrates procedures for controlling voltages according to the variation.

In the above-described embodiments, when the upper and lower electrodes 14 and 15 are maintained in their closed states by applying first the actuation voltage $V_{ACT}$ (step S21) and then the hold voltage $V_{HOLD}$ between the upper and lower electrodes 14 and 15, the voltage TE is changed sequentially from $V_{ACT}$ to $V_{HOLD}$ while maintaining the voltage BE at the ground voltage Vss. Instead, in this embodiment, as illustrated in FIG. 15, the voltage BE is changed from the ground potential Vss to $V_{HOLD'}$ ($=V_{ACT}-V_{HOLD}$) which is higher than Vss, while maintaining the voltage TE at $V_{ACT}$ (steps S21 and S22 of FIG. 16). As a result, the voltage $V_{HOLD}$ may be applied between both the electrodes 14 and 15.

Figure 17:
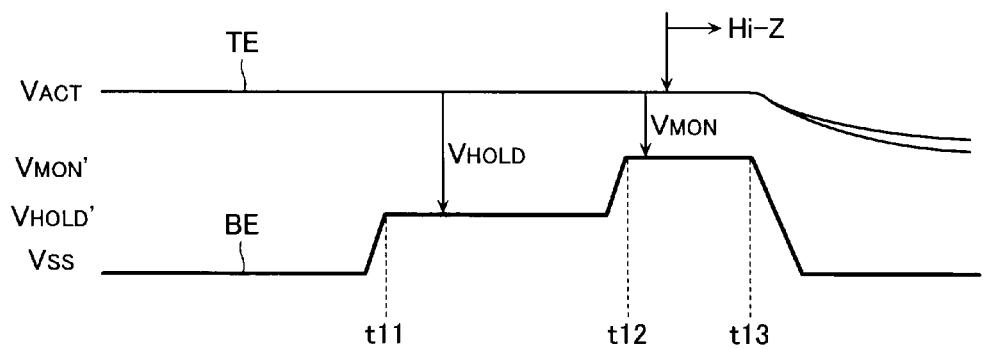
FIG. 17 is a diagram illustrating waveforms of voltages TE and BE applied to the upper electrode 14 and the lower electrode 15 of the semiconductor device according to the variation of the first and second embodiments.
Figure 18:
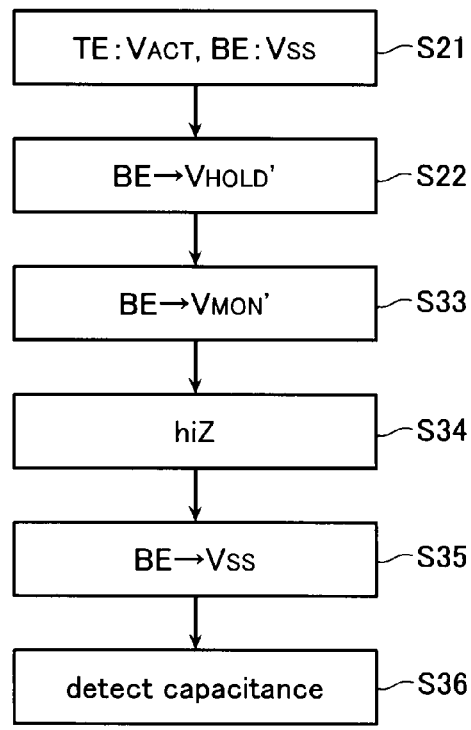
FIG. 18 is a flowchart illustrating the operation of the semiconductor device according to the variation of the first and second embodiments.

Then, when the voltage $V_{MON}$ is applied between both the electrodes 14 and 15, the voltage BE may be changed rather than the voltage TE (see FIG. 17). That is, as illustrated in FIG. 18, after steps S21 and S22, the voltage BE applied to the lower electrode 15 is switched from the voltage $V_{HOLD'}$ to the voltage $V_{MON'}$ (step S33), the upper electrode 14 is then switched to a high impedance state (step S34), and subsequently the voltage BE is switched to the ground voltage Vss (step S35). Since the upper electrode 14 is in a high impedance state, the voltage of the upper electrode 14 rises at step S35 due to the capacitive coupling with the lower electrode 15. As the magnitude of fall in voltage depends on the magnitude of capacitance, the capacitance between the electrodes 14 and 15 may be detected and the degree of charging may be determined by detecting the magnitude of fall in voltage (step S36).

FIG. 14 illustrates the configuration of the integrated circuit unit 20 in the semiconductor device according to the variation. When performing the operation of FIG. 17, a voltage generating circuit 21-4 generates a voltage $V_{ACT}$ and a voltage generating circuit 22-4 generates voltages $V_{HOLD'}$, $V_{MON'}$ ($=V_{ACT}-V_{MON}$), etc. Other components are the same as those described in the first embodiment. In this case, it is preferable that this embodiment eliminates the need for a booster pump if the voltage $V_{HOLD'}$ is not more than a power supply voltage VDD. It is also preferable that this embodiment eliminates the need for generation of additional power supply levels if the voltage $V_{HOLD'}$ is equal to the power supply voltage VDD.

Figure 19:
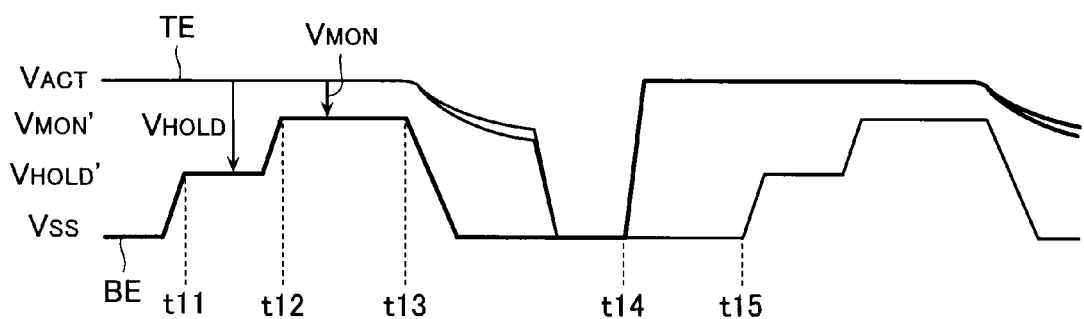
FIG. 19 is a diagram illustrating example waveforms of the voltages TE and BE applied to the upper electrode 14 and the lower electrode 15 in the variation of the first and second embodiments when they are interchanged with each other.
Figure 20:
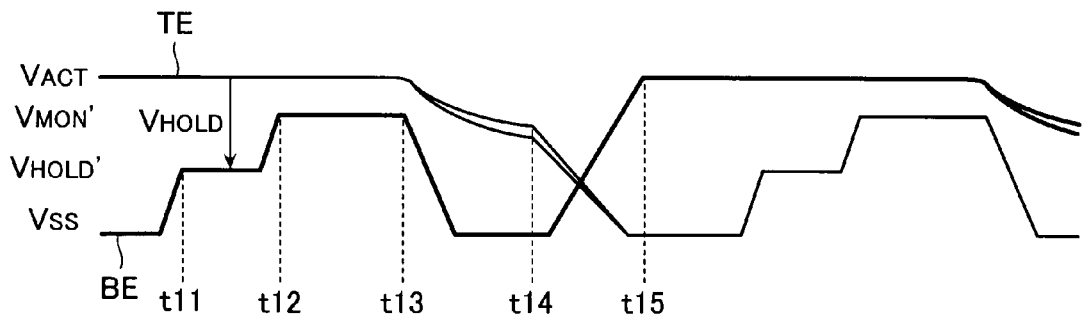
FIG. 20 is a diagram illustrating example waveforms of the voltages TE and BE applied to the upper electrode 14 and the lower electrode 15 in the variation of the first and second embodiments when they are interchanged with each other.

Note that, in this variation, as illustrated in FIGS. 19 and 20, charging states may also be determined in a similar way by interchanging the voltages applied to the upper electrode 14 and the lower electrode 15 and applying the voltage BE to the upper electrode 14 and the voltage TE to the lower electrode 15. At this moment, as illustrated in FIG. 19, when the voltages applied to the upper electrode 14 and the lower electrode 15 are interchanged with each other, a period of time may be provided during which both voltages TE and BE of the electrodes 14 and 15 are once reduced to the ground potential Vss, or that period may be omitted as illustrated in FIG. 20. In addition, as illustrated in FIG. 12A, the above-mentioned actuation voltage $V_{ACT}$ may be used as the voltage TE.

Third Embodiment

Figure 21:
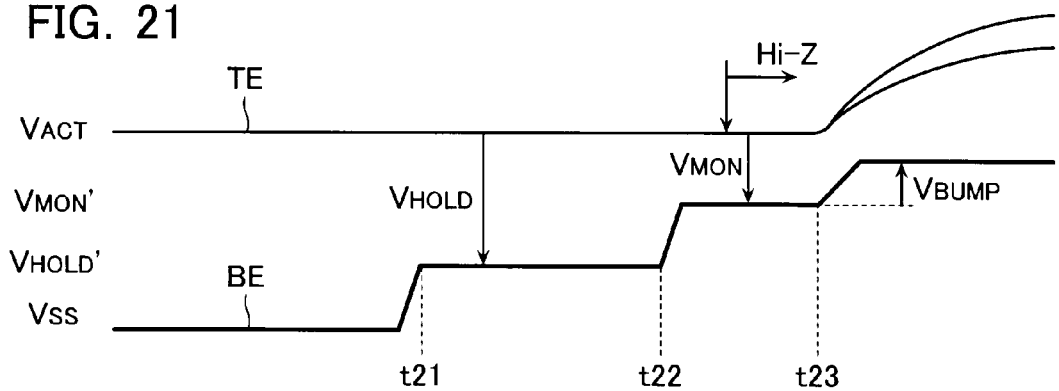
FIG. 21 is a diagram illustrating waveforms of voltages TE and BE applied in a third embodiment.

Referring now to FIGS. 21 through 24, a semiconductor device according to a third embodiment of the present invention will be described below. FIG. 21 illustrates waveforms of the applied voltages TE and BE in this embodiment. FIG. 22A is a block diagram illustrating the configuration of the integrated circuit unit 20 according to the third embodiment. In addition, FIG. 22B is a flowchart illustrating the operation of the semiconductor device according to the third embodiment.

Figure 22A:
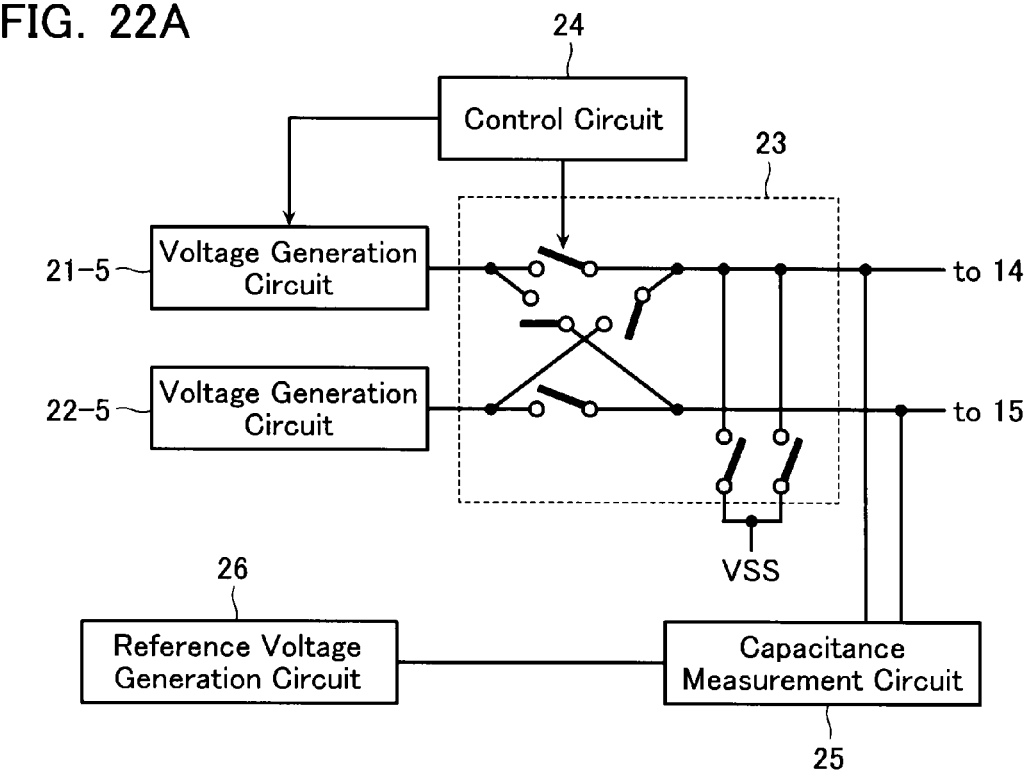
FIG. 22A is a block diagram illustrating the configuration of the integrated circuit unit 20 in the third embodiment.
Figure 22B:
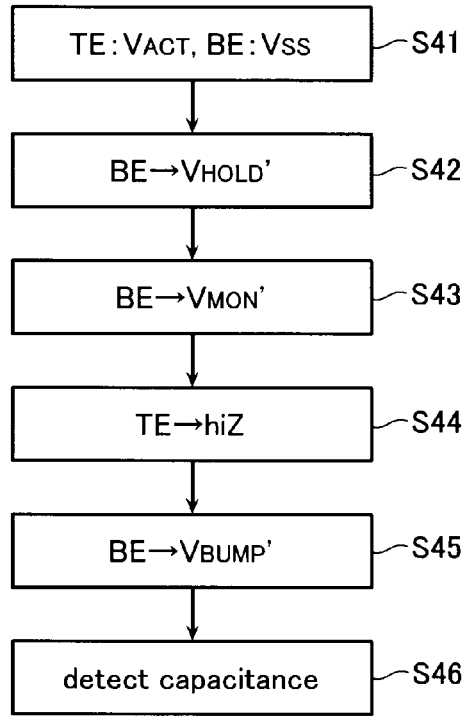
FIG. 22B is a flowchart illustrating the operation of a semiconductor device according to the third embodiment.

The waveforms and operation of this embodiment are the same as those illustrated in FIGS. 17 and 18 with respect to times t21 through t23 of FIG. 21, and steps S41 through S44 of FIG. 22B.

However, this embodiment has a difference in that capacitive coupling is caused in the upper electrode 14 by increasing the voltage BE from the voltage $V_{MON}$ by a voltage $V_{BUMP}$ at time t23, instead of reducing the voltage BE to the ground voltage Vss.

Referring now to FIG. 22A, the configuration of an integrated circuit unit 24 according to this embodiment will be described below. When performing this operation, a voltage generating circuit 21-5 may generate a voltage $V_{ACT}$ and a voltage generating circuit 22-5 may generate voltages $V_{HOLD'}$ and $V_{MON'}$ as well as voltage $V_{MON'}+V_{BUMP}$.

Figure 23:
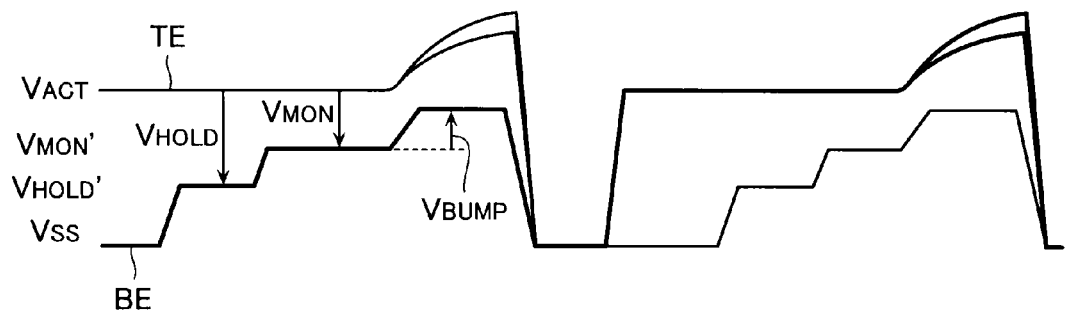
FIG. 23 is a diagram illustrating example waveforms of the voltages TE and BE applied to the upper electrode 14 and the lower electrode 15 in the third embodiment when they are interchanged with each other.
Figure 24:
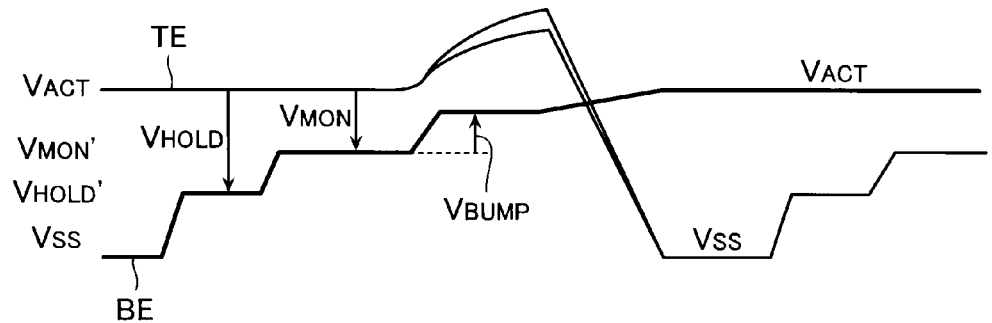
FIG. 24 is a diagram illustrating example waveforms of the voltages TE and BE applied to the upper electrode 14 and the lower electrode 15 in the third embodiment when they are interchanged with each other.

Also in this embodiment, charging states may be determined in a similar way by interchanging the voltages applied to the upper electrode 14 and the lower electrode 15 and applying the voltage BE to the upper electrode 14 and the voltage TE to the lower electrode 15. At this moment, as illustrated in FIG. 23, when the voltages applied to the upper electrode 14 and the lower electrode 15 are interchanged, a period of time may be provided during which both voltages TE and BE of the electrodes 14 and 15 are reduced to the ground potential Vss, or otherwise, that period may be omitted as illustrated in FIG. 24.

While embodiments of the present invention have been described, the present invention is not intended to be limited to the disclosed embodiments and various other changes, additions or the like may be made thereto without departing from the spirit of the invention.

What is claimed is:

1. A semiconductor device controlling an electrostatic actuator having first and second electrodes formed so as to come close to each other by electrostatic attraction against elastic force, the semiconductor device comprising:
   a voltage generation unit generating different types of voltages applied to the first and second electrodes;
   a control unit controlling voltages generated by the voltage generation unit to be applied to the first and second electrodes; and
   a capacitance detection unit detecting a voltage of the first or second electrode to detect a capacitance between the first and second electrodes;
   the control unit configured to sequentially perform:
      applying a first voltage between the first and second electrodes;
      applying a second voltage smaller than the first voltage between the first and second electrodes; and
      switching one of the first electrode or the second electrode to a high impedance state and then changing a voltage applied to the other; and
   the capacitance detection unit configured to detect the amount of change in voltage of the first or second electrode to detect a capacitance between the first and second electrodes.

2. The semiconductor device according to claim 1, further comprising:
   a switching unit inverting voltages of the first and second electrodes based on the result of the detection by the capacitance detection unit.

3. The semiconductor device according to claim 2, wherein the switching unit sets the first and second electrodes to a ground potential before inverting voltages of the first and second electrodes.

4. The semiconductor device according to claim 1, wherein the control unit operates to apply a third voltage larger than the first voltage before applying the first voltage.

5. The semiconductor device according to claim 4, further comprising:
   a switching unit inverting voltages of the first and second electrodes based on the result of the detection by the capacitance detection unit.

6. The semiconductor device according to claim 5, wherein the switching unit sets the first and second electrodes to a ground potential before inverting voltages of the first and second electrodes.

7. The semiconductor device according to claim 1, wherein the first voltage is not less than a minimum voltage necessary for maintaining a state where the first electrode and the second electrode come in contact with each other, and the second voltage is less than the minimum voltage.

8. The semiconductor device according to claim 7, further comprising:
   a switching unit inverting voltages of the first and second electrodes based on the result of the detection by the capacitance detection unit.

9. The semiconductor device according to claim 8, wherein the switching unit sets the first and second electrodes to a ground potential before inverting voltages of the first and second electrodes.

10. The semiconductor device according to claim 7, wherein the control unit operates to apply a third voltage larger than the first voltage before applying the first voltage.

11. The semiconductor device according to claim 10, further comprising:
    a switching unit inverting voltages of the first and second electrodes based on the result of the detection by the capacitance detection unit.

12. The semiconductor device according to claim 11, wherein the switching unit sets the first and second electrodes to a ground potential before inverting voltages of the first and second electrodes.

13. The semiconductor device according to claim 1, wherein the capacitance detection unit is configured to compare the voltage of the first or second electrode with a reference voltage.

14. A method of controlling an electrostatic actuator having first and second electrodes formed so as to come close to each other by electrostatic attraction against elastic force, the method comprising:
    applying a first voltage between the first and second electrodes;
    applying a second voltage smaller than the first voltage between the first and second electrodes;
    switching one of the first electrode or the second electrode to a high impedance state and then changing a voltage applied to the other; and
    detecting the amount of change in voltage of the first or second electrode to detect a capacitance between the first and second electrodes.

15. The method of controlling the electrostatic actuator according to claim 14, wherein the first voltage is not less than a minimum voltage necessary for maintaining a state where the first electrode and the second electrode come in contact with each other, and the second voltage is less than the minimum voltage.

16. The method of controlling the electrostatic actuator according to claim 14, further comprising inverting voltages of the first and second electrodes based on the detected capacitance.

* * * * *